United States Patent
Anderson et al.

(10) Patent No.: US 6,283,553 B1
(45) Date of Patent: Sep. 4, 2001

(54) SEAT BELT RETRACTOR FOR RECLINABLE SEAT BACKS

(75) Inventors: Erick Michael Anderson, Lake Orion; Richard M. Grabowski, Davisburg, both of MI (US)

(73) Assignee: Takata Seat Belts Inc., Auburn Hills, MI (US)

( * ) Notice: Subject to any disclaimer, the term of this patent is extended or adjusted under 35 U.S.C. 154(b) by 0 days.

(21) Appl. No.: 09/721,013

(22) Filed: Nov. 22, 2000

Related U.S. Application Data

(63) Continuation of application No. 09/181,284, filed on Oct. 28, 1998, now abandoned.

(51) Int. Cl.[7] .............................. A47C 31/00; B60R 21/00
(52) U.S. Cl. .................. 297/478; 297/216.13; 242/384.4
(58) Field of Search ...................................... 297/478, 483, 297/216.13; 242/384.4

(56) References Cited

U.S. PATENT DOCUMENTS

| | | |
|---|---|---|
| 3,758,044 | 9/1973 | Nilsson . |
| 3,832,002 | 8/1974 | Eggert, Jr. et al. . |
| 3,838,824 | 10/1974 | Stephenson . |
| 3,838,831 | 10/1974 | Bell . |
| 3,918,658 | 11/1975 | Beller . |

(List continued on next page.)

Primary Examiner—Anthony D. Barfield
(74) Attorney, Agent, or Firm—Fitch, Even, Tabin & Flannery

(57) ABSTRACT

A vehicle-sensitive retractor is provided that can be mounted in a reclinable seat back which has a nominal position inclined to the vertical and that is actuated to a locked position in each of three mutually-perpendicular planes. The retractor has a universal acceleration sensor that compensates for different seat back inclinations so that it does not lock until a threshold vehicle acceleration condition is detected, and so that it will lock regardless of the sensed acceleration when the seat back and retractor are shifted to specified inclinations forward and rearward from the seat back nominally inclined position. The sensor preferably includes a weighted basket that supports an inertia member. At the rearward inclination position, the inertia member operates an actuating mechanism to lock the retractor. A stop engages and prevents adjustment of the support at the seat back's forwardmost inclined position so that at a predetermined angular distance forward therefrom, e.g. 22°, the inertia member causing locking of the retractor before reaching the specified forward inclination position from the design position where the retractor must be locked.

20 Claims, 5 Drawing Sheets

U.S. PATENT DOCUMENTS

| | | |
|---|---|---|
| 3,930,622 | 1/1976 | Tanaka et al. . |
| 3,944,162 | 3/1976 | Henderson . |
| 3,946,965 | 3/1976 | Singh . |
| 3,995,788 | 12/1976 | Stephenson et al. . |
| 3,999,723 | 12/1976 | Magyar . |
| 4,063,777 | 12/1977 | Takada . |
| 4,083,511 | 4/1978 | Ikesue . |
| 4,084,840 | 4/1978 | Buff et al. . |
| 4,090,736 | 5/1978 | Czernakowski . |
| 4,101,092 | 7/1978 | Schmelow et al. . |
| 4,128,261 | 12/1978 | Paitula . |
| 4,135,410 | 1/1979 | Filderman . |
| 4,164,337 | 8/1979 | Blom . |
| 4,220,294 | 9/1980 | DiPaola . |
| 4,253,622 | 3/1981 | Nishina . |
| 4,314,680 | 2/1982 | Takada . |
| 4,343,444 | 8/1982 | Francis . |
| 4,358,155 | 11/1982 | Osterhold et al. . |
| 4,365,838 | 12/1982 | Berg . |
| 4,390,208 | 6/1983 | Widmer et al. . |
| 4,413,794 | 11/1983 | Weman . |
| 4,438,974 | 3/1984 | Kresky et al. . |
| 4,447,017 | 5/1984 | Inukai . |
| 4,483,495 | 11/1984 | Honl . |
| 4,506,844 | 3/1985 | Ernst . |
| 4,522,350 | 6/1985 | Ernst . |
| 4,572,457 | 2/1986 | Hirata . |
| 4,726,540 | 2/1988 | Ches et al. . |
| 4,756,577 | 7/1988 | Berg et al. . |
| 5,163,735 | 11/1992 | Aljundi . |
| 5,163,736 | 11/1992 | Aljundi . |
| 5,390,874 | 2/1995 | Lane, Jr. . |
| 5,495,994 * | 3/1996 | Rumpf et al. .................... 297/478 X |
| 5,660,444 | 8/1997 | Thomas . |
| 5,788,281 | 8/1998 | Yanagi et al. . |
| 5,791,582 | 8/1998 | Ernst . |
| 5,826,813 | 10/1998 | Hibata . |
| 5,842,744 | 12/1998 | Harmon . |
| 5,882,084 * | 3/1999 | Verellen et al. .............. 297/384.4 X |
| 5,950,952 | 9/1999 | Koketsu . |
| 6,105,164 | 1/2000 | Yano . |

* cited by examiner

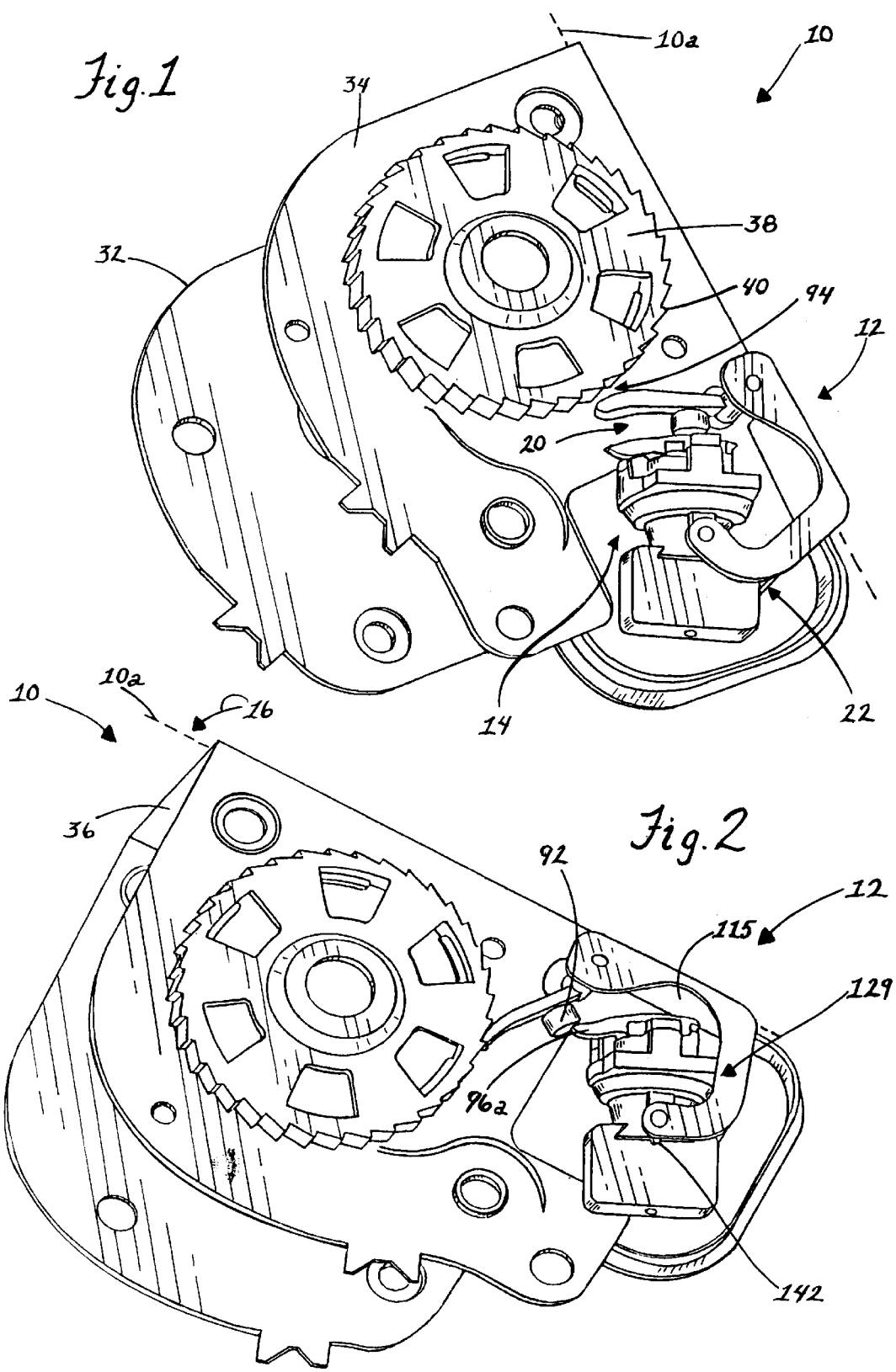

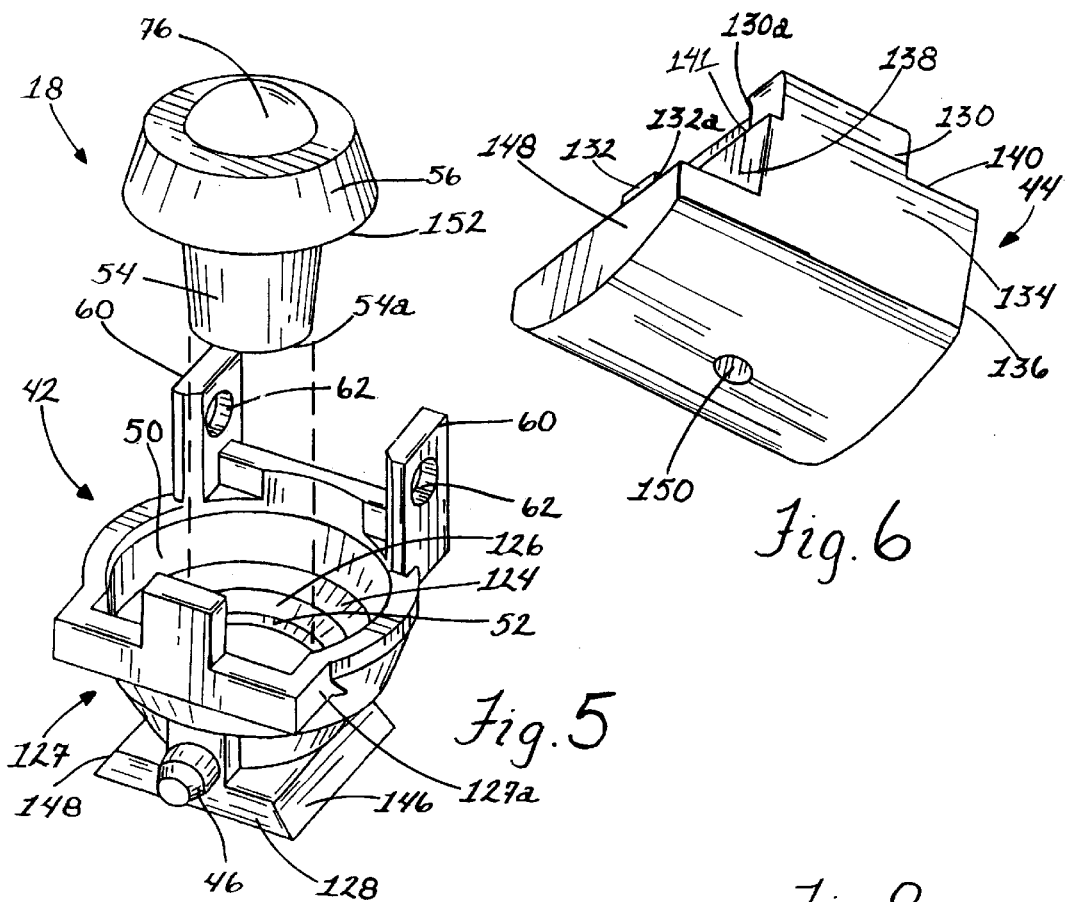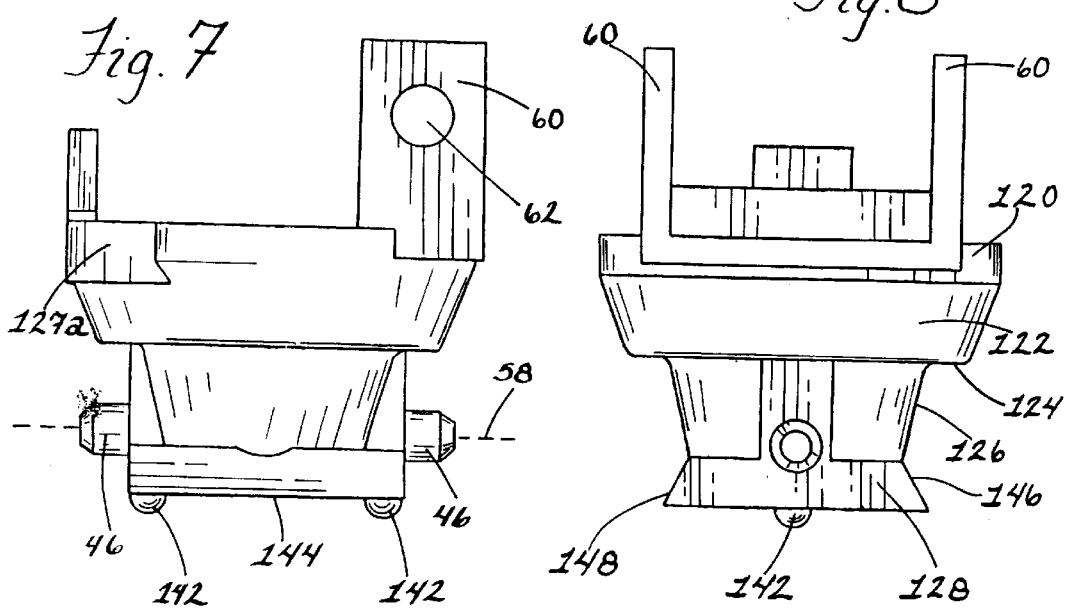

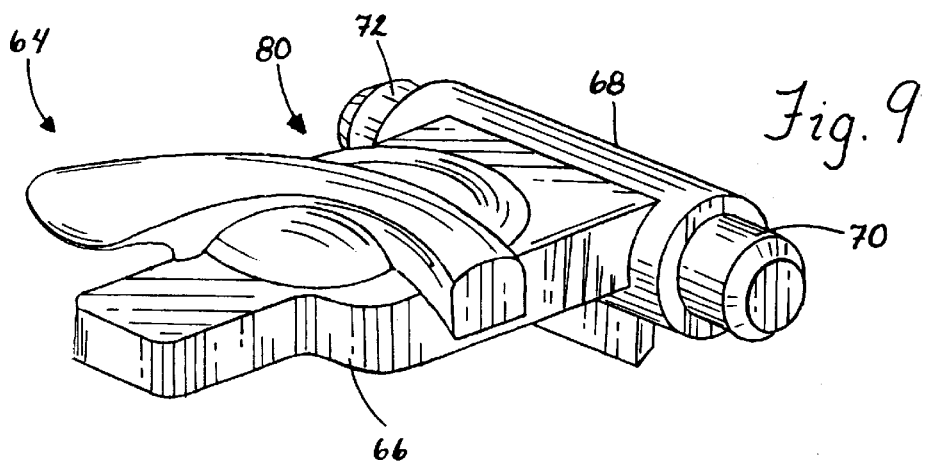
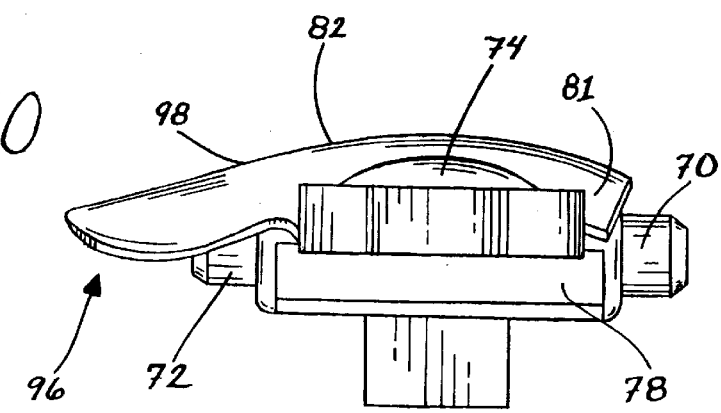
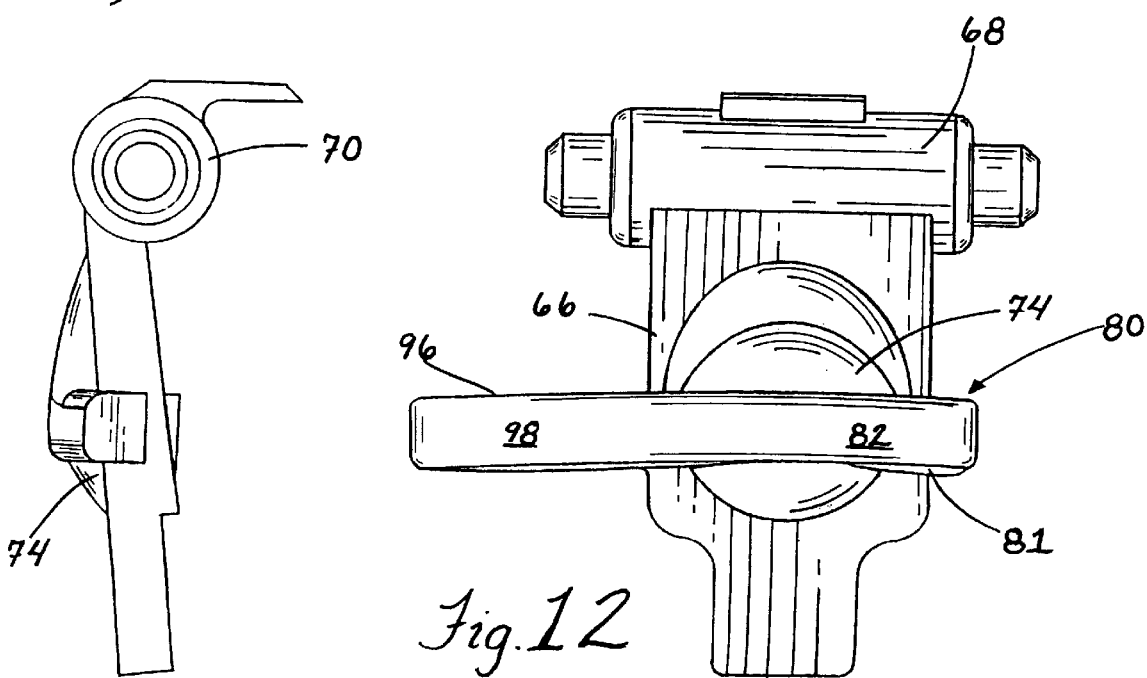

SEAT BELT RETRACTOR FOR RECLINABLE SEAT BACKS

This is a continuation of prior application Ser. No. 09/181,284, filed Oct. 28, 1998, now abandoned which is hereby incorporated herein by reference in its entirety. The entire disclosure of the prior application, from which a copy of the oath or declaration is supplied under paragraph 3 below, is considered as being part of the disclosure of the accompanying application, and is hereby incorporated by reference therein.

FIELD OF THE INVENTION

The invention relates to seat belt retractors and, more particularly, to seat belt retractors having universal acceleration sensors for use in reclinable seat backs.

BACKGROUND OF THE INVENTION

There are regulations currently in place in the U.S. that mandate certain retractor locking requirements which specify that acceleration sensors must be operable to lock the retractor at either one of two conditions. The first condition requires that at threshold accelerations of 0.7 g's, the sensor should cause locking of the retractor in any of three mutually-perpendicular planes. In these planes, the retractor must also lock at the specified acceleration when tilted at 45° increments to a range of 180° in the plane.

Automobiles are manufactured with their seat backs at a nominal design and installed position from which they can be shifted and tilted forwardly and rearwardly to respective maximum forward and rearward inclinations of the seat backs. Accordingly, §209 specifies that if the first condition is not met by the seat back retractor, the other alternative condition that must be satisfied is that the retractor lock when tilted forward or rearward 45° from the design position of the seat back. Where the retractor has the previously-described types of inertia members that may not satisfy the first condition of §209 in properly detecting vertically aligned accelerations, the second condition where locking must be present at 45° from the design position of the seat back must be established.

One of the difficulties in providing a commercially successful, inclinable retractor being shifted with a changing of the seat inclination is maintaining the sensitivity of the retractor locking mechanism, which typically means keeping the gap between the pawl and ratchet teeth at a constant distance. This is difficult because the inertia weight is often carried in a pivotal support and shifts relative to the pawl, which is mounted on a stationary support. The retractor locking mechanism's sensitivity should be substantially the same when the inertia member is at the nominal seat back position or when swung through almost 45° as when closely adjacent the rearward inclination position.

While there have been a number of prior art acceleration universal sensors designed for use in reclinable seat backs, many of these use inertia members that will not shift properly to sense accelerations in an aligned vertical plane. Further, none of these prior art universal inertia sensors successfully meet the specifications that require locking of the retractor at specified angular range of 45° its position at installation, i.e., its designed position.

SUMMARY OF THE INVENTION

In accordance with the present invention, a retractor may be mounted on an inclinable seat back; and the retractor locks at specified forward and rearward inclinations. More specifically, the retractor incorporates a universal acceleration sensor that compensates for different seat back inclinations so that it does not lock until a threshold vehicle acceleration condition is detected, and so that it will lock regardless of the sensed acceleration when the seat back and retractor are or were shifted or specified inclinations forward and rearward from the seat back inclined designed position. In this manner, the vehicle sensitive retractor herein is particularly tailored to meet automotive specifications that require retractor locking at specified angular inclinations on either side of the seat back design position.

Typically, prior seat belt retractors having universal sensors typically allow for equal inclinations from one side to the other of a vertical plane such that, unlike the present retractor, they are not specifically tailored to ensure locking at specific angles forward and rearward from a designed and installed position of the seat back. The design and installed inclined position of the seat back is the inclined position at which it comes delivered from the manufacturer, e.g. 18.5° from vertical. For different manufacturers or vehicles, the retractor is designed to be operated at a specific installed position that is predetermined and known, usually vertical when mounted on a pillar or the like or inclined to the vertical when mounted on a seat. The particular specification at hand requires that the retractor be locked at 45° forward and rearward from an inclined design position such that where the design position is at 18.5°, the retractor must be locked at 63.5° inclined rearwardly from the vertical.

In one form of the present invention, the vehicle sensitive retractor herein includes an inertia sensor that has a pivotally mounted universal support that is biased to remain substantially vertical as the seat back is tilted forwardly and rearwardly on either side of the design position. Stops engage the support to stop pivoting of the support when engaged therewith. An actuator mechanism locks the retractor reel either by operation of the inertia member, or when the retractor is reclined to a predetermined rearward inclination position. The rearward inclination position is designed so that it is at an angular spacing from the designed and installed position of the seat back that substantially corresponds to that set forth in the previously-described retractor locking specifications. As the seat back and retractor thereon are pivoted downwardly from the inclined design position, a distal projection on the actuating mechanism locks the retractor reel either by operation of the inertia member, or when the retractor is reclined to a predetermined rearward inclination position. The rearward inclination position is designed so that it is at an angular spacing from the designed and installed position of the seat back that substantially corresponds to that set forth in the previously-described retractor locking specifications. As the seat back and retractor thereon are pivoted downwardly from the inclined design position, a distal projection on the actuating mechanism causes a locking of the retractor.

The support engages the other stop when the retractor and seat back are shifted forwardly of the design position to a predetermined forward inclination position. At this position, the actuator mechanism will not lock the retractor until the inertia member senses at least a 0.7 g acceleration. As previously mentioned, the relevant retractor locking specifications mandate locking at a predetermined angular spacing forward of the design position, as well. Once the support hits the other stop, upon continued pivoting of the retractor past this point towards the vertical and then inclined back on the other side of the vertical, the retractor acts like a normal retractor so that the continued pivoting causes the inertia member to become less stable and more prone to actuation as the support and inertia member now pivot with the retractor. The particular inertia member will become operable as by toppling over where a standing man kind of inertia member is utilized at a predetermined amount of pivoting thereof. The position of the forward stop is predetermined and the inertia member is chosen so that the amount of pivoting before it becomes operable will be well within the forward limit set by the retractor locking specifications. And because this limit will generally be on the side of the vertical beyond which the seat back will not be pivoted, it is acceptable to rely on the inertia member to operate the actuating mechanism for locking the retractor as sensitivity variances caused by pivoting of the inertia member and support will not be of a concern.

On the other hand, sensitivity is an important issue on the side of the vertical where the seat back will be used and pivoted between different positions. On this operative side, it is important that the inertia sensor used with the retractor maintain substantially the same sensitivity to accelerations throughout substantially the entire range of seat back inclinations. In this regard, preferably the stops are arranged so to correspond to the forward the rearward limits of seat back inclinations so that throughout the operative range of seat back inclinations, the universal support pivots relative to the retractor and stays substantially vertical and keeps the inertia member in its predetermined positioned supported thereby which, with a standing man, is in an upright non-pivoted position. Since the rearward inclination position is on this operative side of the vertical, instead of relying on the inertia member to lock the retractor at the mandated angular distance from the design position, the actuator mechanism is constructed so that it will lock the retractor without operation of the inertia member to keep the sensitivity of the sensor to accelerations substantially the same throughout the entire range of seat back inclinations.

In a preferred form of the invention, a seat belt retractor is provided having a inertia sensor for being mounted to a reclinable seat back in a vehicle. The retractor can include a rotatable reel carrying a toothed wheel for rotation therewith. An inertia sensor is provided and includes a pendulum assembly for staying in a substantially vertical orientation as the seat back is inclined through a predetermined angular range having as limits predetermined forward and rearward inclinations of the seat back. An inertia member is supported in a predetermined position by the pendulum assembly as the seat back is inclined through the predetermined angular range and shifts from the predetermined position in response to a predetermined vehicular acceleration for locking of the retractor reel. A housing support pivotally mounts the pendulum assembly and is fixed to the retractor so that as the retractor changes inclination with adjustments to the seat back, the pendulum assembly pivots relative to the housing support to maintain its vertical orientation. A primary actuator is provided for being shifted by the inertia sensor at the predetermined vehicular acceleration, and a secondary actuator is provided for being shifted by the primary actuator to lock the toothed wheel to stop rotation of the reel when the inertia member shifts from its predetermined position, and when the sat back is reclined to its rearward limit without shifting of the primary actuator or the inertia member.

A significant feature of the present invention lies in the provision of the aforesaid primary and secondary actuators that are constructed so that at the rearward limit of the seat back inclinations, the secondary actuator will be shifted into locking engagement with the retractor reel without shifting of the primary actuator or of the inertia member. Thus, as the seat back approaches its limit of being inclined in a rearward direction, it will be locked regardless of whether the inertia member has shifted. In this manner, the sensitivity of the inertia member is not made to vary as there is no reliance on shifting of the inertia member to cause retractor locking at the rearward limit of seat back inclinations.

The preferred retractor herein is designed such that the rearward inclination is at 45° from the designed inclined position of the seat back in accordance with the previously-described automotive specifications. Whereas the locking of the retractor at the rearward limit of inclination does not rely on shifting on the inertia member, e.g. toppling of the standing man, 45° forward from the design position corresponds to a tilting of the seat back that is forward from the vertical. As most American sedans do not have seat backs that tilt forwardly from the vertical and in fact have as a forward limit a small amount of inclination, e.g. 5.5°, at which the seat back is reclined back from the vertical, the shifting of the inertia member as caused by tilting of the seat back can be relied upon without concern as to creating problems as to the sensitivity of the locking of the retractor.

Thus, unlike the universal retractors of the prior art, the vehicle sensitive retractor preferably has a stop that is specifically provided to be operable at the forward limit of seat back inclinations. Once the stop is operable, the retractor herein works like a regular retractor that does not adjust as the seat back is inclined. Accordingly, continued inclination of the seat back after the stop becomes operable will eventually cause the inertia member to become operable which causes the actuator mechanism to lock the retractor reel. Any sensitivity variances beyond this forward limit at which the stop is operable occasioned by the lack of functioning of the universal support when engaged with the stop are not of concern, as previously described. As long as the inertia member is operable by continued tilting of the retractor before the 45° forward angular spacing from the nominal position required by the relevant automotive retractor specifications, there is no problem in meeting and satisfying these requirements. For example, with a standing man that topples when it is pivoted 22° from vertical and where the full forward position is 5.5° inclined back from the vertical and at which a stop engages the universal support, the standing man will cause locking well before the 26.5° limit on the other side of the vertical 45° forward from the 18.5° design position, and more specifically will cause locking of the retractor at approximately 16.5° on the other side of the vertical.

Thus, the present retractor is particularly well adapted to be utilized in reclinable seat backs while keeping the sensitivity of the inertia member substantially the same throughout the operative range of seat back inclinations from the design inclination while at the same time meeting automotive specifications in terms of locking at a predetermined angular range forward and rearward from the design position at which the seat back comes delivered from the manufacturer.

Another stop can also be provided at the rearward limit of seat back inclinations to stop relative pivoting between the housing and pendulum assembly thereat.

In a preferred form, the primary actuator has a distal projection on which the secondary actuator rides so that the predetermined rearward inclined position at which the secondary actuator locks into the tooth wheel without shifting of the primary actuator or inertia member is at approximately 63.5°.

The inertia member and primary actuator can include cooperating arcuate surfaces to permit relative movement therebetween without shifting of the primary actuator when the inertia member is in its predetermined position. In this manner, during tilting of the seat back and retractor, any relative movement between the inertia member and primary actuator will not cause the retractor to lock until approaching a position 45° from the design position.

The retractor may be installed in a seat back inclined at approximately 18.5°, and at 45° inclined forwardly and rearwardly of the design installed inclination, the secondary actuator is in locking engagement with the toothed wheel. In this manner, the vehicle sensitive retractor herein satisfies the retractor locking specification requiring that the retractor be locked at 45° on either side of the nominal position.

The primary actuator can include a programmed surface portion so that with the inertia member in its predetermined position and as the seat back is inclined, the secondary actuator will slide along the programmed surface portion keeping a substantially constant gap between the secondary actuator and the toothed wheel. A distal projection can be provided adjacent the programmed surface portion for shifting the secondary actuator into locking engagement with the toothed wheel as the seat back is being inclined to the predetermined, rearward, inclined, locking position. Accordingly, the primary and secondary actuators work together to keep the sensitivity of the sensor substantially constant until the secondary actuator reaches the distal projection of the primary actuator which starts to shift the secondary actuator toward the teeth of the retractor wheel, and into engagement therewith at the specified angular distance rearward from the nominal position which can correspond to the rearward limit of travel of the seat back.

In a preferred form of the invention, an inertia sensor for a seat belt retractor that is to be mounted in an adjustable seat back in a vehicle is provided and includes a inertia member for sensing predetermined vehicular accelerations. A pendulum support for the inertia member is provided for staying in a substantially vertical orientation at different seat back inclinations. The inertia member is supported by the support in a predetermined position and shifts from the position when the predetermined acceleration is sensed. A first actuator is pivotally mounted to the support with the first actuator pivoting in response to shifting of the inertia member during predetermined vehicle accelerations. A housing for the pendulum support is provided and is affixed to the retractor. A second actuator is pivotally mounted to the housing for pivoting into locking engagement with the retractor. A first stop of the housing engages the support at a first inclination of the seat back with the second actuator out of locking engagement with the retractor. A second stop of the housing engages the support at a second inclination of the seat back that is greater than the first seat back inclination so that with the second stop in engagement with the support, the first actuator will pivot the second actuator into locking engagement with the retractor at the second seat back inclination.

In a preferred form, the first and second inclinations of the seat back are the limits of the angular adjustments through which the seat back can be reclined, the inertia member is a standing man, and the pendulum support includes a weighted basket that stays vertically oriented as the seat back is adjusted between the first and second inclinations and supports the standing man in an upright predetermined position during said adjustment so that the sensitivity of the standing man to shifting in response to predetermined accelerations stays substantially the same through substantially the entire range of seat back inclinations.

BRIEF DESCRIPTION OF THE DRAWINGS

FIG. 1 is a perspective view of a vehicle sensitive retractor in accordance with the present invention showing a universal support engaged with a stop at a forwardly inclined position of the retractor;

FIG. 2 is a perspective view of the vehicle sensitive retractor of FIG. 1 inclined rearwardly from the FIG. 1 position so that the support engages another stop on the housing and a secondary actuator is shifted into engagement with a toothed wheel for locking the retractor;

FIG. 5 is a perspective view of a standing man inertia member and a support basket therefor;

FIG. 6 is a perspective view of a pendulum weight for being attached to the inertia member support of FIG. 5;

FIG. 7 is an end elevational view of the inertia member support of FIG. 5;

FIG. 8 is a side elevational view of the inertia member support of FIG. 5;

FIG. 9 is a perspective view of a primary actuator for resting on the inertia member and being shifted thereby;

FIG. 10 is a side elevational view of the primary actuator of FIG. 9 showing the programmed surface portion thereof and projection adjacent thereto upon which the secondary actuator rides as the retractor is inclined;

FIG. 11 is an end elevational view of the primary actuator of FIG. 9;

FIG. 12 is a plan view of the primary actuator of FIG. 9;

DETAILED DESCRIPTION OF THE PREFERRED EMBODIMENT

Figure 3:
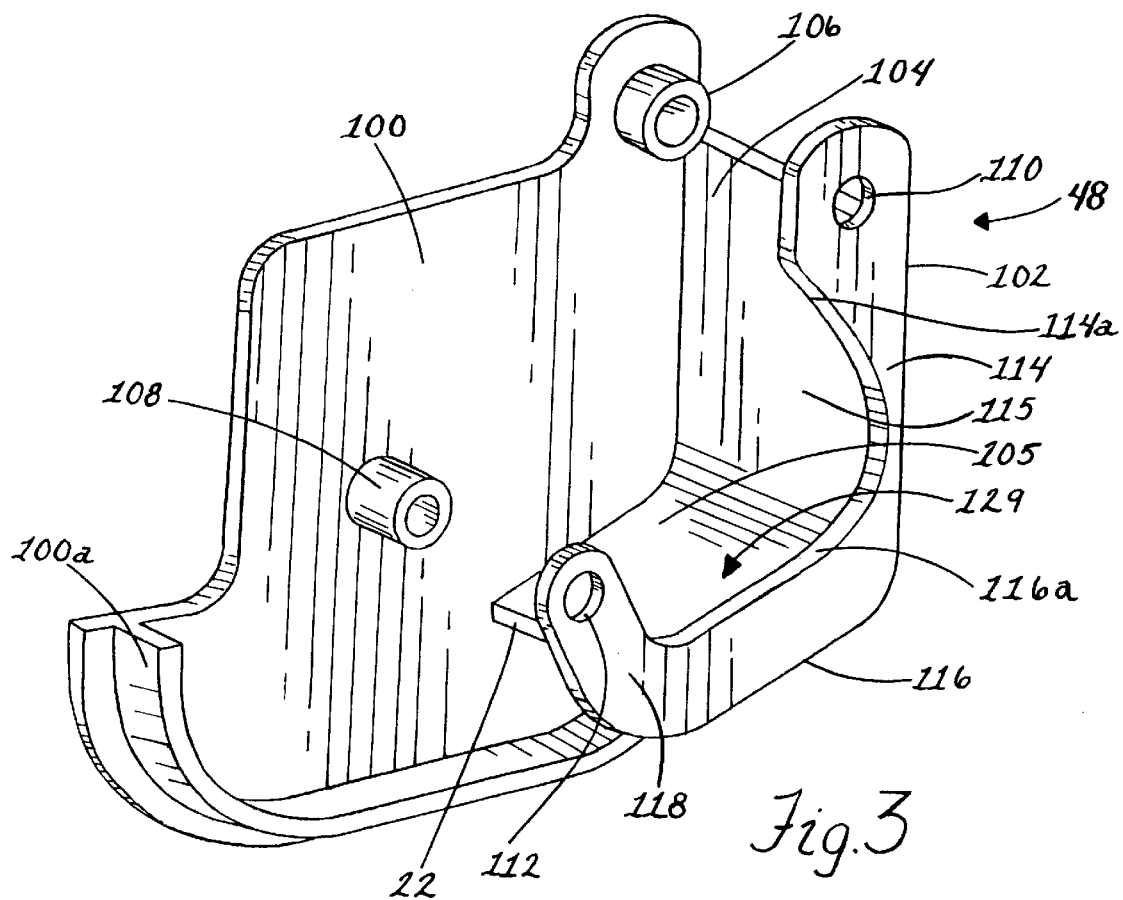
FIG. 3 is a perspective view of a housing for the inertia sensor.

In FIGS. 1 and 2, a vehicle sensitive retractor 10 in accordance with the present invention is shown. The retractor 10 incorporates an inertia sensor 12 for sensing predetermined vehicular accelerations to lock the retractor 10 against belt payout therefrom. The inertia sensor 12 has a universal support generally designated 14 that allows the retractor 10 to have its orientation changed through a predetermined range of inclinations, as illustrated in FIG. 5, relative to the vertical without causing the retractor 10 to be locked absent sensing of the predetermined vehicle acceleration condition by the sensor 12. The inertia sensor 12 is designed such that the retractor 10 can be inclined about arrow 16 through a predetermined angular range of inclinations from the vertical with the universal support 14 staying in a substantially vertical orientation throughout this range of inclinations. In this manner, the universal support 14 keeps an inertia member 18 (FIG. 5) in a predetermined position without shifting as the retractor 10 and seat back (not shown) to which it is mounted are adjusted through a predetermined angular range of retractor 10 and seat back inclinations. Thus, the universal support 14 allows the retractor 10 to be mounted in a reclinable seat back such that tilting of the seat back will not substantially change the sensitivity of the sensor 12 in detecting vehicle accelerations and will not cause locking of the retractor 10 against belt payout therefrom.

The retractor 10 herein is also specifically designed so as to meet the retractor locking specifications that mandate locking of the retractor at specified angular spacings forwardly and rearwardly from its design inclined position of the seat back as it is installed and shipped from the automobile manufacturer. To this end, the retractor 10 includes an actuator mechanism generally designated 20 that is operable by the inertia member 18 when the inertia member 18 senses the predetermined acceleration and shifts in response thereto. When the inertia member 18 shifts in response to sensing the predetermined vehicle acceleration, the actuator mechanism 20 causes the retractor 10 to become locked against rotation. In addition, the actuator mechanism 20 is constructed so that when the retractor 10 is shifted rearwardly to a predetermined angular distance from the design position as specified by the pertinent retractor regulations, the actuator mechanism 20 will cause a locking of the retractor 10 without requiring that the inertia member 18 be shifted from its predetermined position on the support 14. In this manner, the present retractor 10 does not rely on the inertia member 18 to achieve retractor locking at the specified angular distance rearward from the nominal position so that the sensitivity of the sensor 12 remains substantially the same as the retractor 10 moves through the angular range as the seat back is adjusted and tilted.

The regulations also require that the retractor be locked at an angular distance forwardly from the nominal position of the seat back that is equal to the distance at which it is to be locked rearward from the nominal inclined position. As previously discussed, most vehicles do not have seat backs that tilt forwardly beyond the vertical. The present retractor 10 has a stop 22 for engaging the support 14 at a predetermined forward inclination of the retractor 10 and seat back to which it is mounted. Continued pivoting of the retractor 10 past this predetermined forward inclined position will cause the support 14 and inertia member 18 to pivot to cause the actuating mechanism to lock the retractor. When the support 14 and inertia member 18 continues to pivot with further retractor inclination, the inertia member 18 will eventually shift from its predetermined position thereby operating the actuator mechanism 20 to lock the retractor 10. In the preferred form, the inertia member 18 is a standing man type of inertia member that topples over at a predetermined tilting or inclination from the vertical, e.g. 22°. Balls, pendulums or other inertia members could be used rather than the inertia member illustrated herein. Depending on what the design position, a stop could be provided and used to actuate and lock the retractor when shifted 45° forwardly from the design position, if such an inclination of the seat was permitted.

Figure 14:
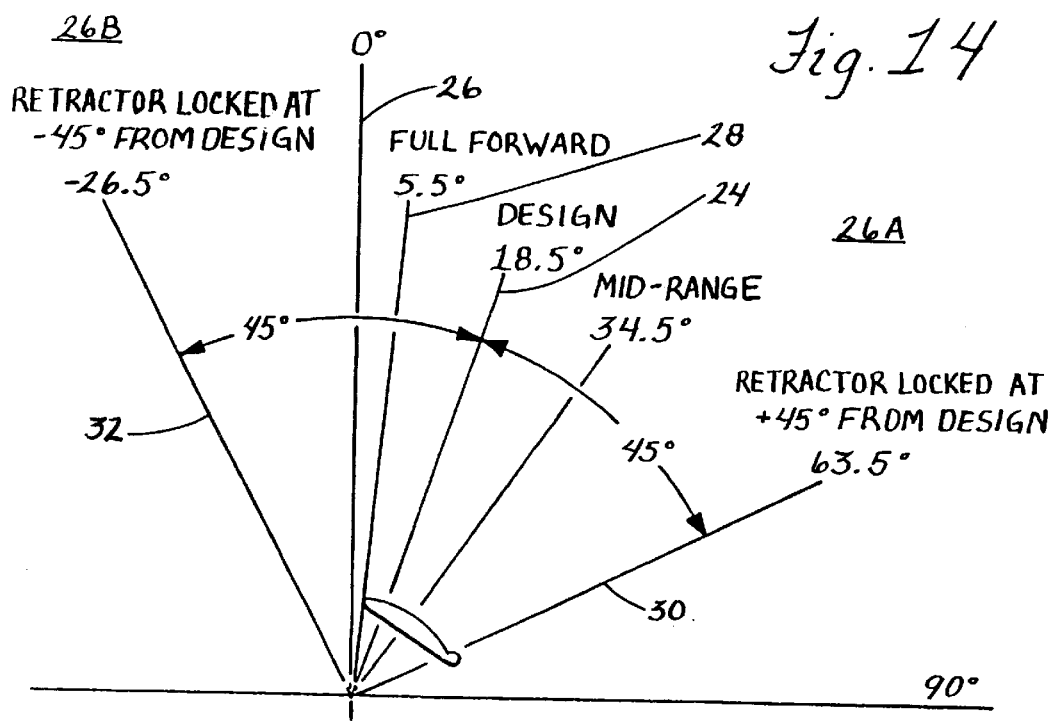
FIG. 14 is a graph indicating the various inclined positions of the retractor and seat back to which it is to be mounted and showing the retractor locked positions at 45° forward and rearward from a seat back design position.

Referring to FIG. 14, one exemplary application where the retractor 10 is mounted to a seat back is depicted in graph form where the seat back design position 24 is shown as 18.5° inclined back from vertical axis 26 on side 26a thereof. On this side 26a of the vertical, the seat back can be adjusted through a predetermined range of angular inclinations from its full forward position 28 which is shown as 5.5° inclined back from the vertical 26 to its full rearward inclined position 30. The full rearward inclined position can correspond to the position 30 at which the retractor is locked at 45° rearwardly from the design position 24 as mandated by the retractor locking specifications. The present requirements of the specification mandate that the retractor be locked at both 45° forwardly and rearwardly from the design position 24. Assuming that the longitudinal axis 10a of the retractor 10 is aligned with the axis of the seat back when mounted thereto, the actuator mechanism 20 will be effective to lock the retractor 10 when the seat back is reclined to 63.5° from the vertical 26 at position 30 which can correspond to the rearward limit of seat back travel. At the rearward limit 30 of seat back inclinations, the actuator mechanism 20 is operable to lock the retractor 10 without requiring that the inertia member 18 be shifted from its predetermined position relative to the support 14.

The full forward position 28 of the seat back at 5.5° inclined rearwardly from vertical 26 is only 13° forwardly from the design position 24. When the seat back is at its full forward position 28, the support 14 engages stop 22 of the retractor 10. With the stop 22 engaged with the support 14 so as to prevent its pivoting relative to the retractor 10, should there be continued inclination of the retractor 10 past the full forward position 28, the retractor 10 will act as a normal retractor. Accordingly, continued pivoting of the retractor 10 and universal support 14 therewith past the full forward position 28 will cause the inertia member 18 to shift from its predetermined position at a predetermined angular spacing from the full forward position 27. Where the standing man 18 of FIG. 5 is utilized as the inertia member, the standing man 18 will topple when it is tilted approximately 22°. Thus, the standing man 18 will topple well before the forward locked position 32 that is 45° angularly spaced forward from the design position 26 at which retractor locking is mandated by the relevant retractor specifications. Accordingly, in testing of the illustrated retractor 10, once the retractor 10 reaches the full forward position 28 so that the support 14 engages stop 22, the inertia member 18 will cause locking of the retractor 10 at 22° from that point, or in other words at −16.5° inclined back on the other side 26B of the vertical 26. Manifestly, the locking of the retractor can be varied from this −16.5° position to other portions so long as the locking is achieved at or before the 45° forward position 32. As is apparent, locking of the retractor at −16.5° is well within the specification of −26.5° at position 32 that is currently required.

Thus, while the inertia member 18 is not relied upon to achieve the locked condition of the retractor 10 45° rearwardly from the design position 24, operation of the inertia member 18 is used to lock the retractor 10 before the forward locked position 32 on the other side 26B of the vertical 26. Such reliance on operation of the inertia member 18 beyond the full forward position 28 does not impact negatively on the performance of the retractor 10 as though the operative range of seat back inclinations between positions 28 and 30 on the operative side 26a of the vertical, the universal support 14 is fully functioning so as to maintain consistency in terms of the sensitivity of the inertia member 18 to vehicle accelerations. Since the forward locked position 32 is well beyond the full forward position 28 of the seat back and in fact on the other side 26B of the vertical at which the seat back is not operative, any variations in sensitivity as caused by reliance on operation of the inertia member 18 to lock the retractor 10 by the time it reaches the forward locked position 32 will not adversely affect operation of the vehicle sensitive retractor 10 herein. Further, because operation of the inertia member 18 is not relied upon for locking of the retractor 10 at the rear locked position 30, the sensitivity of the inertia sensor 12 can be maintained substantially the same throughout the operative range of seat back inclinations between full forward position 28 and to the full rear locked position 30.

The retractor 10 can take on a variety of forms including the illustrated form where the retractor 10 has sidewalls 33 and 34 that are interconnected by end wall 36. A reel (not shown) is journaled for rotation between the walls 33 and 34 with the reel having a length of seat belt webbing wound thereon that can be protracted and retracted therefrom for use in restraining passengers in their seats in an automobile. The reel frame supports a locking mechanism in the form of ratchet wheel 38 that rotates with the reel and has a plurality of teeth 40 formed about its periphery. Locking the retractor 10 against protraction of seat belt webbing wound on the reel is achieved upon shifting of the actuator mechanism 20 into engagement with the ratchet wheel teeth 40 so as to block continued rotation of the ratchet wheel 38 and reel carrying the seat belt wound thereon. The particular locking mechanism may be changed from that described and illustrated herein as there are many forms of locking mechanism that are commercially used and which could be actuated by an actuating mechanism, such as the actuating mechanism 20.

The universal support 14 is shown in FIGS. 5–8 and is preferably in the form of a basket 42 having a weight member 44 (FIG. 6) to be attached thereto to pivot the basket to the true vertical position 26. Pivot axles or trunnions 46 extend laterally outward from either side of the basket 42 for pivotally mounting the weighted basket universal support 14 to the retractor 10, and specifically sensor housing 48, as will be more fully described hereinafter. The basket 42 has an interior surface 50 having various diameters as will be described herein and at the bottom of which is a substantially flat annular seat 52 for supporting the bottom of the standing man 18 thereon. The standing man 18 has a tapered lower portion 54 and an enlarged upper head portion 56. The basket annular seat 52 supports the bottom of the standing man lower portion 54 so that the standing man 18 is maintained in a predetermined substantially upright position when the support 14 is in its vertical orientation.

The pivot axles 46 of the support 14 define a pivot axis 58 for the weighted basket universal support 14 when pivotally mounted to the housing 48. The pivot axis 58 is generally aligned with the bottom of the basket portion 42 of the support 18, and particularly the seat 52 thereof on which the standing man 18 pivots for sensing accelerations of the vehicle. As the basket 42 and attached weight member 44 form a pendulum assembly that is heavier than the small, light-weight standing man 18, the lesser mass and inertia of the lighter standing man 18 will cause it to have more sensitivity to vehicle accelerations versus the heavier pendulum support assembly 14. Thus, the standing man 18 will shift at a faster rate from its predetermined upright position in response to vehicle accelerations that reach a predetermined threshold level; in comparison to the heavier pendulum support assembly 14 with its greater weight and inertia which shifts first at a lower threshold, but at a much slower rate than the standing man in response to accelerations of the vehicle.

Spaced vertical projections 60 extend upwardly from the top of the basket 42 at its forward and rearward ends along one side of the basket 42. The projections 60 each include an aperture 62 for pivotally mounting primary actuator 64 thereto. The primary actuator 64 is shown in FIGS. 9–12 and includes a transverse body portion 66 having a pivot shaft 68 formed along one side of the body portion 66. The pivot shaft 68 includes reduced diameter front and a back ends 70 and 72 for pivotally mounting in the projection apertures 62. The shaft ends 70 and 72 can be provided with a taper or chamfer similar to the apertures 62 for tightly fitting therein.

The primary actuator body portion 66 has a domed portion 74 which extends convexly from the top of the body 66. Similarly, the head portion 56 of the standing man 18 has a rounded or domed portion 76 which extends convexly upward from the flat top thereof. The body 66 has a chamber 78 formed below the domed portion 74 and having a surface (not shown) that is convexly shaped to match the curvature of the domed portion 74 on the underside thereof. Thus, with the actuator 64 pivotally mounted to the inertia member support or pendulum assembly 14 as by pivot shaft 68 and projections 60 thereof and with the standing man 18 supported in its upright position in the basket 42 by the annular seat 52, the rounded top 76 of the standing man 18 will project into the chamber 78 and into engagement with the underside of the domed portion 64 of the actuator 74. It is preferred that the respective domed portions 74 and 76 of the actuator 64 and standing man 18 have substantially the same radium of curvature such that relative motion between the support 14 and inertia member 18 before toppling of the inertia member 18 in response to the threshold predetermined acceleration will not cause shifting or pivoting of the actuator 64 as could change the sensitivity of the actuating mechanism 20 during most of the relative travel or motion between the domed portions 74 and 76. In this manner, there is neither a substantial change in sensitivity nor a premature locking of the retractor 10 by the actuator mechanism 20 before the threshold acceleration is sensed.

Figure 13:
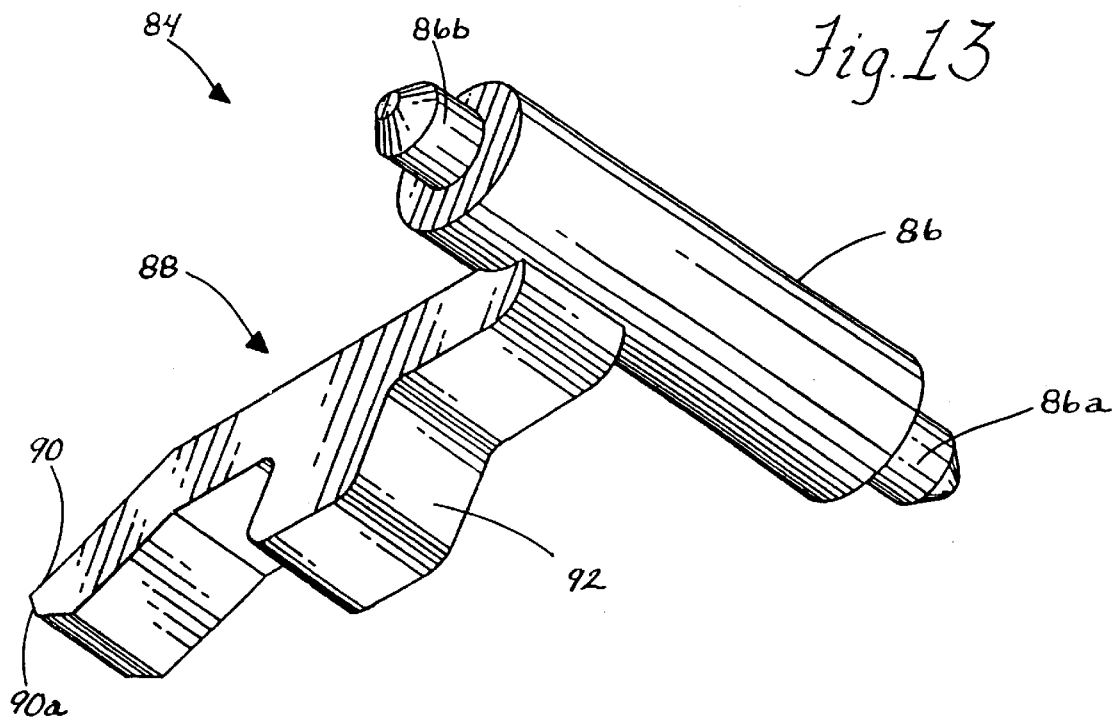
FIG. 13 is a perspective view of a secondary actuator including a lower foot portion for riding on the primary actuator as the retractor is inclined.

The primary actuator 64 has an elongated extension portion 80 (FIGS. 9–12) that extends generally parallel to the pivot shaft 68 transverse to the body portion 56 and across the domed portion 74 thereof. The extension portion 80 includes portion 81 thereof that is provided with a top contoured engagement surface section 82 for supporting secondary actuator 84 (FIG. 13) which rides thereon as the retractor 10 and seat back are tilted. The secondary actuator 84 similar to primary actuator 64 has a pivot shaft 86 extending laterally at its front end for pivotally mounting the actuator 84 to sensor housing 48, as will be more fully described hereinafter. Extending rearwardly and transverse to the pivot shaft 86 is pick or pawl portion 88. The pawl portion 88 extends rearwardly to a distal end or tooth 90 which is squared off to provide a flat abutment surface 90a for engaging in the teeth 40 of the ratchet wheel 38 when the vehicle reaches the threshold acceleration or at the specified inclination positions 30 or 32 from the design position 24. The pawl portion 88 includes a depending foot projection 92 for resting on top of the primary actuator extension portion 80.

The secondary actuator 84 rests on the primary actuator 64 and respective pivot axes of these actuators are at 90° to one another. The engagement surface section 82 on the primary actuator 64 is contoured relative to the contour of the surface 82 so that as the secondary actuator foot projection 92 is caused to slide therealong by tilting of the seat back and retractor 10, the distal end 90 of the secondary actuator pawl portion 88 will stay consistently spaced from the ratchet wheel teeth 40. Thus, the sensitivity of the locking mechanism is maintained as the basket pivots. That is, the contour of the surface section 82 is programmed so that a substantially constant gap 94 is maintained between the end 90 of the secondary actuator pawl portion 88 and the teeth 40 of the ratchet wheel 38 during tilting of the seat back through most of the seat back inclination. By keeping the gap 94 constant, the sensitivity of the sensor 12 to vehicular accelerations will not change despite having the seat back at different angles of inclinations to the vertical 26. More specifically, the contoured engagement surface 82 preferably defines an arc of a circle which has a center that substantially coincides with the pivot axis 58 of the pendulum support assembly 14. Accordingly, as the retractor 10 is caused to move through the angular range of seat back inclinations, the secondary actuator 84 will move in a circular path about the programmed surface portion 82 with its distal end 90 kept at a consistent spacing 94 from the ratchet wheel teeth 40.

As previously discussed, the actuator mechanism 20 is constructed such that when the seat back and retractor 10 mounted thereto are reclined to their rearward inclination position 30, the actuator mechanism 20, and specifically the primary actuator 64 and secondary actuator 84 cooperate to cause the retractor 10 to be locked against belt protraction therefrom, as shown in FIG. 2. In this regard, the extension 80 of the primary actuator 64 includes a distal portion or projection 96 extending rearwardly from the portion 81 thereof including the contoured engagement surface 82 towards the ratchet wheel teeth 40. Thus, as the retractor 10 is tilted rearward, the foot projection 92 of the secondary actuator 84 will eventually move from the contoured engagement surface 82 onto the flatter surface 98 of the projection 96. When the secondary actuator foot projection 92 reaches the distal projection portion 96 of the extension 80, continued pivoting of the retractor 10 towards the rearward inclination position 30 causes the foot projection 92 to ride on the flat surface 98 so that the secondary actuator distal end 90 moves towards the ratchet teeth 40. When the retractor 10 is tilted to the rearward inclination postion 30, the secondary actuator foot projection 92 will be supported by the rearward end 96a of the projection 96 with its squared off end 90a moved into locking engagement with the ratchet wheel teeth 40, as is shown in FIG. 2.

In this manner, the projection 96 of the extension portion 80 of the primary actuator 64 is operable to cause the secondary actuator 84 to lock the retractor 10 at the mandated angular distance, i.e., 45°, from the design position 24 at rearward inclination position 30 without requiring that the standing man 18 shift or topple to cause the primary actuator 64 to be shifted for lifting the end 90 of the secondary actuator 84 into engagement with the teeth 40. As previously discussed, by avoiding reliance on operation of the standing man 18 at and beyond the 45° rearward position 30, the sensitivity of the sensor 12 can remain substantially unchanged during pivoting of the seat back and retractor 10 until they reach a point that is close to the rearward inclination position 30 at which the foot projection 92 begins to ride on the distal projection 96 of the primary actuator extension portion 80 so that the secondary actuator end 90 starts to be lifted towards the ratchet teeth 40. Accordingly, there is only a short angular distance of seat back inclination where the foot projection 92 is riding on the primary actuator projection 96. During this time, the sensor 12 will become more sensitive to vehicle accelerations because the secondary actuator distal end 90 will begin to move closer to the ratchet teeth 40 so that it will shift into engagement therewith more quickly due to the decreasing gap 94 therebetween. This heightened sensitivity of the sensor 12 will be of little practical consequence s it will only occur when the seat back is reclined almost all the way back to its rearmost inclination position 30 where presumably the seat back will rarely be used, particularly if on the driver side of the vehicle.

Figure 4:
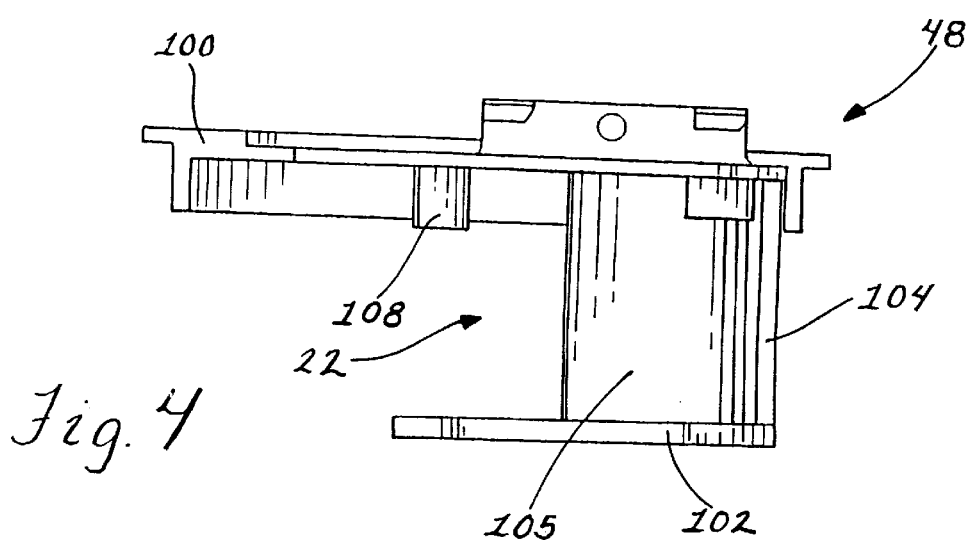
FIG. 4 is a plan view of the inertia sensor housing of FIG. 3.

Referring to FIGS. 3 and 4, the stationary housing 48, which is fixed to frame sidewall 34, will next be more particularly described. The housing 48 has a side wall 100 mounted to the retractor side wall 34 at the bottom thereof below the toothed wheel 38. As previously mentioned, both the pendulum universal support 14 and in particular the basket 42 thereof and the secondary actuator 84 are pivotally mounted to the housing 48. To this end, the housing 48 has a side arm 102 parallel to side wall 100 and interconnected therewith by way of front end wall 104 which is integral with rearwardly angled portion 105 of the wall 104 that terminates at the previously described transverse stop 22. The side wall 100 has a front, upper cylindrical boss 106 and a rear, lower cylindrical boss 108 that are aligned across from apertures 110 and 112 formed in the side arm 102. The aperture 110 is formed at the upper end of substantially vertical portion 114 of the arm 102 and the aperture 112 is formed in rearwardly extending portion 116 of the arm 102 at the top of upturned end 118 thereof. The pendulum or weighted basket support 14 is pivotally mounted to the housing 48 with pivot axles 46 inserted into the cylindrical boss 108 and the aperture 112 aligned across therefrom so that the projections 60 are adjacent the side wall 100 of the housing 48.

With the pivot shaft ends 70 and 72 pivotally mounted in the projection apertures 62, the primary actuator body portion 66 extends transversely and away from retractor wall 34 and housing wall 100 affixed thereto. With this arrangement, the primary actuator extension portion 80 will be laterally spaced from the housing wall 100 and extend rearwardly so that portion 96 thereof projects beyond the basket 42, as can be seen in FIGS. 1 and 2. In addition, the housing upper boss 106 and aperture 110 aligned therewith for pivotally mounting reduced chamfered ends 86a and 86b of the secondary actuator pivot shaft 86 are generally spaced above projection apertures 62. Accordingly, the secondary actuator 84 as pivotally mounted to the housing 48 via boss 106 and aperture 110 thereof will be disposed over the primary actuator 64 pivotally mounted to the basket 42 and such that the rearwardly extending pawl portion 88 of the secondary actuator 84 will be aligned over the rearwardly extending extension portion 80 of the primary actuator 64 will the foot projection 92 supported on top surface sections 82 or 98 of the extension 80. In this manner, toppling of standing man 18 causes the primary actuator 64 including the extension portion 80 thereof to shift and pivot about pivot shaft 68 which, in turn, lifts and pivots the secondary actuator 84 supported by the primary actuator portion 80 about its pivot shaft 86 and into engagement with the ratchet wheel teeth 40 for locking the retractor against belt protraction therefrom.

Referring to FIGS. 5–8, the basket 42 preferably includes an upper annular section 120 with an intermediate tapered section 122 extending downwardly therefrom to horizontal ledge wall 124 which projects radially inward from the bottom of the tapered section 122. A lowered tapered section 106 extends from the radial inner edge of the ledge wall 124 down to the annular seat 52. Thus, the inner surface 50 of the basket 42 generally tapers from the large diameter annular section 120 down to a smaller diameter at the bottom of the lowered tapered section 106 where the seat 52 is formed.

The housing side arm 102 (FIGS. 3 and 4) is spaced laterally from the side wall 100 so as to minimize the size of the housing 48. In this regard, the basket 42 has a bracket portion 127 formed at the side of the basket annular and tapered sections 120 and 122 spaced from the housing wall 100 and which has a forward transverse abutment portion 127a for engaging stop 129 formed on inner edge 116a of the housing arm portion 116, as best seen in FIG. 3. In order to provide the support 14, inertia member 18 and primary actuator 64 with clearance as the housing 48 is pivoted along with the retractor 10 towards the rearward inclination position 30, inner edge 114a of housing arm vertical portion 114 is provided with a cutout area 115. In this manner, there is no interference from the arm vertical portion 114 as the retractor 10 and housing 48 are pivoted rearward. The side wall 100 is provided with an integral flange 100a extending about its lower periphery for tightly receiving as by a friction fit a housing cover (not shown) thereon so that the housing 48 encloses the sensor 12 therein while taking up little space on the bottom and side of the retractor 10.

With the weighted basket or pendulum support 14 pivotally attached to the housing 48, the bracket portion 127 will extend laterally beyond the housing arm 102. In addition, both stops 22 and 129 will be disposed forwardly on one side of the pivot axis 58. Thus, as the seat pivots and causes the retractor 10 to be pivoted rearwardly towards the rearward inclination position, the housing 48 affixed to the retractor 10 will pivot about axis 58 bringing the arm portion 116 towards the pendulum support 14, and more specifically bringing the stop 129 into engagement with the abutment portion 127a of the basket bracket portion 127 once the retractor 10 reaches the rearward inclination position 30. At this time, the foot projection 92 of the secondary actuator 84 will be at the end 96a of the primary actuator extension portion 80 so that the secondary actuator end 90 is in engagement with the ratchet wheel teeth 40, as previously described. Accordingly, at the rearward inclination position 30, engagement of the support 14 and specifically bracket transverse portion 127a with the stop 129 coincides with the locking of the retractor ratchet wheel 38 by the actuator mechanism 20 and specifically by cooperation of the primary actuator 64 and the secondary actuator 84. As the seat back preferably does not recline past rearmost inclination position 30, engagement of the stop 129 with the basket portion 127 so that the support 14 does not adjust at inclinations of the retractor 10 that are past position 30 will have no practical significance.

Pivoting of the retractor 10 forwardly form the rearward inclination position 30 and towards the full forward position 28 causes the wall portion 105 to be pivoted toward the weight member 44 of the weighted basket support 14. Once the full forward position 28 of seat back inclination has been reached at 5.5° in this instance, as shown in FIG. 1, the support 14, and specifically the weight member 44 thereof will be in engagement with the stop 22 on the housing wall portion 105. At this point, the actuator mechanism 20 will not be in locking engagement with the retractor 10 absent the vehicle reaching the threshold acceleration required for shifting of the inertia member 18. If there were a continued pivoting of the retractor 10 past the full forward position of 5.5° to a −26.5° position, the retractor 10 would act as a normal retractor 10, as the support 14 no longer adjusts, with the standing man toppling to actuate the locking mechanism 20 to lock the retractor. That is, the standing man inertia member is designed to topple at an inclination of 22° so that tilting of the retractor 10 forward 22° from the full forward position 28 of the seat back would cause the standing man 18 to topple which, in turn, would cause the actuator mechanism 20 to lock the retractor 10. As discussed, because pivoting of the retractor 10 beyond the full forward position 28 preferably is not within the operative range of seat back inclinations, no problems arise by having the sensitivity of the inertia sensor 12 vary as is caused when the support 14 is in engagement with the stop 22 and the retractor 10 is pivoted forward past the full forward position 28. In this regard, reliance upon toppling of the standing man 18 to cause locking of the retractor 10 at a point before the design locked position 32 is acceptable.

The details of construction of the illustrated weight member 44, which acts to pivot the basket 42 relative to the seat back and the seat turns, will now be described. Preferably, a dovetail fit between the weight member and the basket is used. To this end, a trapezoidal-shaped mounting foot 128 can be provided at the bottom of the basket 42 for mounting the weight member 44 thereto. The weight member 44 has upper arms 130 and 132 including respective facing surfaces 130a and 132a that are inclined and diverge away from each other as they extend from the top toward the bottom of their respective arms 130 and 132. The surfaces 130a and 132a define a trapezoidal space therebetween substantially matching the shape of the mounting foot 128. The arms 130 and 132 extend upwardly form a main body portion 134 of the weight member 44 and spaced from vertical sides 136 and 138 thereof so that a shoulder top surface 140 of the body portion 136 is formed between sides of the arms 130 and 132 and body portion sides 136 and 138. Below the inclined surfaces 130a and 132a, raised abutment portion 141 extends between the arms 130 and 132 projecting above the body portion top surface 140. A pair of small, semi-circular bump projections 142 are raised from bottom surface 144 of the trapezoidal foot portion 128 and are spaced centrally between oppositely inclined surfaces 146 and 148 thereof. The bump projections 142 are laterally spaced from each other at a distance that is slightly greater than the length of the arms 130 and 132.

To attach the weight member 44 to the basket 42, and specifically the arms 130 an 132 to the mounting foot 128, the mounting foot 128 is oriented so that its inclined surfaces 146 and 148 are in confronting tight fitting relation with arm inclined surfaces 130a and 132a so as to prevent relative movement in a front to back or longitudinal direction between the weight member 44 and the basket 42. With the trapezoidal mounting foot 128 received in the trapezoidal space defined between the arms 130 and 132 and specifically the oppositely inclined surface 130a and 132a thereof, the raised bumps 142 will be in tight fitting engagement with either side of the abutment portion 141 so as to keep the weight member 44 from shifting laterally with respect to the basket 42.

As shown, the weight member 44 can be provided with a lower portion 148 below the body portion 136 to increase the weight and inertia of the weight member 44 to ensure that it stays substantially vertical as the seat and retractor 10 are pivoted and so that the standing man 18 reacts properly to sensed vehicle accelerations, as previously discussed. In addition, the interior surface 50 of the basket 42 tapers down to a throughpassageway formed in the basket foot portion 128 that is aligned with a similar throughpassageway 150 extending vertically through the weight member 44 so that any mixture or particulate member that gains access into the housing 48 and the weighted support basket 18 can escape therethrough.

With the basket 42 and weight member 44 assembled, and standing man 18 is placed in the basket 42 so that the standing man lower portion 54 is supported at its bottom 54a by the annular seat 52, as previously discussed. The diameters across the lower tapered portion 126 of the basket 42 is at all points sufficiently larger than the corresponding diameters of the standing man lower portion 54 so as to provide room for lateral shifting or toppling over of the standing man 18 in the basket 42. Standing man portion 54 has a height greater than that of the basket lower portion 146 so that the enlarged head 56 of the standing man 18 is disposed in the area defined by the annular section 120 and intermediate tapered section 122 of the basket 42. Again, the diameters of the basket sections 120 and 122 are sized to be larger than the corresponding diameters of the standing man head 56 so as to provide sufficient room for lateral shifting and toppling over of the standing man 18 when the vehicle threshold acceleration is reached.

The standing man 18 includes a shoulder 152 between the lower portion 54 and enlarged upper head portion 56 thereof which engages the basket ledge wall 124 when the standing man 18 topples from its upright position. In this manner, the standing man 18 is kept from tipping too far over such that the engagement of the standing man shoulder 152 with the basket wall 124 allows the standing man 18 to right itself back to its upright position once the vehicle accelerations subsides below the threshold acceleration so that the sensor 12 is again operable to detect vehicle accelerations that exceed the threshold acceleration required for toppling of the standing man 18. Similarly, when the retractor 10 is tilted beyond the design locked rearward and forward inclination positions 30 and 32, the engagement between the standing man shoulder 152 and basket ledge wall 124 keeps the standing man 18 in the same toppled over position where it is ready to return to its upright position when the retractor 10 is inclined back to an inclination that is between the positions 30 and 32.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A vehicle-sensitive retractor for use with a pivoted vehicle seat back having a design, installation position inclined to the vertical and which permits belt payout until the retractor is tilted forwardly or rearwardly to a specified inclination from the design installation position or above a predetermined acceleration, the retractor comprising:
    a retractor frame;
    a rotatable reel mounted in the frame having a seat belt wound thereon for protraction and retraction;
    a locking mechanism on the reel for locking the rotatable reel against turning in the direction of belt protraction;
    an inertia member for sensing vehicle acceleration and shiftable between inoperative and operative positions;
    a universal support pivotally mounted on the retractor frame and carrying the inertia member and being biased to remain substantially vertical as the retractor is tilted keeping the inertia member in its inoperative position; and
    an actuator mechanism operable by the inertia member shifted to its operative position with the retractor tilted forward to the forward specified position so that the actuator mechanism causes the locking mechanism to lock the reel and being operable with the inertia member in its inoperative position and the retractor tilted rearward to the rearward inclination position to cause the locking mechanism to lock the reel.

2. The retractor of claim 1 including a housing arm for being fixed to the retractor and including stops, and wherein the universal support includes a pivot for being pivotally mounted to the housing arm to pivot about an axis and stay vertically oriented as the retractor is tilted until engaged with the stops with the stops being arranged on one side of the pivot axis and the design installation position of the seat back being at the other side of the pivot axis.

3. The retractor of claim 1 wherein the rearward inclination postion is at approximately 63.5° from the vertical.

4. The retractor of claim 1 wherein the actuator mechanism includes a primary actuator in engagement with the inertia member for being shifted thereby as the inertia member shifts from its operative position to its inoperative position and a secondary actuator in engagement with the primary actuator for being shifted thereby into locking engagement with the rotatable reel.

5. The retractor of claim 4 wherein the primary actuator has a contoured engagement surface that keeps the secondary actuator consistently spaced from locking into the rotatable reel as the second actuator rides on the engagement surface during tilting of the retractor through a large portion of a predetermined operative range of angular inclinations of the seat back.

6. The retractor of claim 5 including a housing fixed to the retractor, and
    wherein the universal support includes a weighted basket pivotally mounted to the housing to pivot about an axis, and the contoured engagement surfaces has a profile defining an arc of a circle that is centered on the pivot axis to keep consistent spacing of the secondary actuator from the retractor reel during tilting of the retractor through the large portion of the predetermined range of angular inclinations.

7. The retractor of claim 4 wherein the primary actuator includes a distal portion on which the secondary actuator rides as the inclination of the retractor and seat back approached the rearward inclination position such that when approaching the rearward inclination position, the secondary actuator causes operation of the locking mechanism with the retractor reel without shifting of the inertia member.

8. A seat belt retractor having an inertia sensor for being mounted to a reclinable sat back in a vehicle, the seat back having a predetermined inclination range between forward and rearward positions in which it is operable, the retractor comprising:
    a rotatable reel of the retractor carrying a toothed wheel for rotation therewith;
    a pendulum assembly of the inertia sensor for staying in a substantially vertical orientation by pivoting about a pivot axis as the seat back is inclined through the predetermined inclination range;
    an inertia member that is supported in a predetermined inoperative position by the pendulum assembly as the seat back is inclined through the predetermined inclination range and shifts from the predetermined inoperative position in response to a predetermined vehicular acceleration to an operative position for locking of the retractor reel;
    a housing for pivotally mounting the pendulum assembly and fixed to the retractor so that as the retractor changes inclinations with adjustment of the seat back, the pendulum assembly pivots relative to the housing to maintain its vertical orientation;
    a primary actuator for being shifted by the inertia member at the predetermined vehicular acceleration;
    a secondary actuator including a distal end thereof with the secondary actuator being shiftable by the primary actuator so that the distal end is engaged with the toothed wheel to lock the toothed wheel to stop rotation of the reel with the seat back inclined to its rearward inclined position without shifting of the primary actuator or the inertia member;
    a contoured engagement surface of the primary actuator on which the secondary actuator rides, the contoured engagement surface defining an arc of circle about the pendulum assembly pivot axis with the engagement surface sized so that the distal end of the secondary actuator maintains a substantially consistent spacing form the toothed wheel during inclinations of the seat back and retractor therewith for substantially the entire extent of its predetermined operative inclination range for maintaining sensitivity of the retractor to locking at the predetermined vehicle acceleration substantially constant despite seat back and retractor inclinations; and a stop of the housing at a predetermined position relative to the pendulum assembly to be engaged therewith at the forward position of the predetermined range of seat back inclinations to stop relative pivoting between the housing and pendulum assembly and so that the inertia member will shift from its predetermined inoperative position in response to a predetermined amount of continued inclination of the retractor beyond the forward position to cause shifting of the secondary actuator for locking the retractor wheel.

9. The retractor of claim 8 wherein the primary actuator has a distal projection including a surface having a flattened contour relative to the arc-shaped engagement surface on which the secondary actuator rides as the seat back and retractor closely approach the rearward inclination position so that at the predetermined rearward inclined position the secondary actuator distal end locks into the toothed wheel without shifting of the primary actuator or inertia member to its operative position.

10. The retractor of claim 8 wherein the inertia member and primary actuator include cooperating arcuate surfaces to permit relative movement therebetween without shifting of the primary actuator when the inertia member is in its predetermined position.

11. The retractor of claim 8 wherein the retractor is adapted to be installed at a design position in a seat back inclined at approximately 18.5°, and at 45° inclined forwardly and rearwardly of the design installed position, the secondary actuator is in locking engagement with the toothed wheel.

12. The retractor of claim 8 wherein the primary actuator includes a projection adjacent the contoured engagement surface for shifting the secondary actuator into locking engagement with the toothed wheel when the seat back is inclined to the predetermined rearward inclined position.

13. The retractor of claim 8 wherein the housing includes another stop at a predetermined position relative to the pendulum assembly to be engaged therewith at the rearward position of the predetermined range of seat back inclinations to stop relative pivoting between the housing and pendulum assembly.

14. An inertia sensor for a seat belt retractor that is to be mounted to an adjustable seat back in a vehicle, the inertia sensor comprising:

an inertia member for sensing predetermined vehicular accelerations and movable between inoperative and operative positions;

a pendulum support for the inertia member for staying in a substantially vertical orientation at different seat back inclinations, and the inertia member being supported by the support in the predetermined inoperative position and shifting from the inoperative position to the operative position when the predetermined acceleration is sensed;

a first actuator pivotally mounted to the support with the first actuator pivoting in response to shifting of the inertia member to its operative position during predetermined vehicle accelerations;

a housing for the pendulum support and for being affixed to the retractor;

a second actuator pivotally mounted to the housing for pivoting into locking engagement with the retractor;

a first stop of the housing at a predetermined position to engage the support at a first inclination position of the seat back with the second actuator out of locking engagement with the retractor so that only continued pivoting of the retractor forwardly beyond the first inclination position can cause retractor locking via movement of the inertia member to its operative position; and a second stop of the housing at a predetermined position to engage the support at a second inclination of the seat back that is greater than the first seat back inclination so that engagement of the second stop with the support coincides with the first actuator pivoting the second actuator into locking engagement with the retractor at the second seat back inclination with the inertia member in its inoperative position.

15. The inertia sensor of claim 14 wherein the first and second inclinations of the seat back are the limits of the angular adjustments through which the seat back can be reclined, the inertia member is a standing man, and the pendulum support includes a weighted basket that stays vertically oriented as the seat back is adjusted between the first and second inclination positions and supports the standing man in an upright predetermined position during said adjustment so that the sensitivity of the standing man to shifting in response to predetermined accelerations stays substantially the same through substantially the entire range of seat back inclinations.

16. A seat belt retractor for mounting on an inclinable vehicle seat back pivotable between a forwardmost inclined position and a rearwardmost inclined position from an intermediate, nominal position, the retractor adapted to be locked when it reaches a predetermined angular inclination thereof in either of forward or rearward directions from the nominal position, the retractor comprising:

a retractor frame;

a rotatable reel mounted on the frame and having a seat belt mounted thereon for protraction and retraction;

a locking mechanism to lock the reel against protracting the belt;

a standing man inertia member for shifting between an inoperative position and an operative position by sensing a predetermined vehicle acceleration or by a predetermined amount of inclination thereof from the vertical; and an actuating mechanism operable to lock the reel when the seat is inclined rearwardly by the predetermined inclination thereof from the nominal position to the rearwardmost inclined position with the standing man in its inoperative position and maintained thereat through the entire range of inclinations between the forwardmost and rearwardmost inclination positions of the seat back to keep sensitivity of the standing man to the predetermined vehicle acceleration substantially the same through the entire range of seat back inclinations, the actuating mechanism being operated by the standing man shifted to its operative position by forward inclination of the retractor frame by the predetermined amount past the forward inclination position to cause the locking mechanism to lock the retractor reel by the predetermined inclination thereof forwardly from the nominal position.

17. A seat belt retractor in accordance with claim 16 wherein:

a swingable support for the inertia member is pivotally mounted on the retractor frame and keeps the inertia member at the true vertical as the seat back is inclined between the forwardmost and rearwardmost inclined positions thereof;

said actuating mechanism comprises a forward stop to limit pivoting of the swingable support causing the standing man to shift to its operative position relative to the swingable support when the retractor is inclined forwardly by the predetermined amount from the seat back forwardmost inclined position.

18. A seat belt retractor in accordance with claim 16 wherein the predetermined angular inclination of the retractor is 45° from the nominal position for the inclinable seat.

19. A seat back mounted retractor system for a vehicle, the system comprising:

a pivotal seat back having a predetermined operative range of seat back inclinations from a full forward position to a full rearward position, the seat back having a design installation position intermediate the forward and rearward position;

a retractor from which a seat belt is protracted and retracted, the retractor being mounted to the seat back for pivoting therewith;

an inertia member having a predetermined inoperative position and a predetermined operative position with the inertia-member shifting from the inoperative position to the operative position during a predetermined vehicle acceleration;

a locking mechanism that locks the retractor against seat belt protraction, the locking mechanism including a pawl an toothed wheel;

an actuating mechanism that causes the locking mechanism to lock the retractor upon a predetermined amount of inclination thereof either forwardly or rearwardly from the design position regardless of whether the predetermined vehicle acceleration occurs, the actuating mechanism having a surface on which the pawl rides, the surface including a first surface portion configured for keeping the pawl consistently spaced from the toothed wheel during seat back retractor inclinations from the full forward position to close to the full rearward position, and a second surface portion configured to cause the pawl to engaged in the toothed wheel with the seat back and retractor inclined to the full rearward position with the full rearward position substantially coinciding with the predetermined amount of retractor inclination rearwardly from the design position; and a support for the inertia member that is pivotally mounted to keep the inertia member in the predetermined inoperative position for substantially the entire operative range of sat back inclinations to keep the sensitivity of the inertia member to the predetermined vehicle acceleration substantially the same at the operative inclinations of the seat back and retractor therewith.

20. The seat back mounted retractor system of claim 19 wherein the seat back inclinations forwardly from the design positions to the full forward position defines a forward range of seat back inclinations, and the predetermined inclination amount of the retractor forward from the design position is greater than the forward seat back inclination range so that there is a non-overlapping range of retractor inclinations forwardly of the full forward position, and a stop of the actuating mechanism that engages the pivotal support so that sensitivity of the inertia member changes with the retractor in the non-overlapping range of retractor inclinations.

* * * * *

UNITED STATES PATENT AND TRADEMARK OFFICE
CERTIFICATE OF CORRECTION

PATENT NO.      : 6,283,553 B1
DATED           : September 4, 2001
INVENTOR(S)     : Anderson et al.

It is certified that error appears in the above-identified patent and that said Letters Patent is hereby corrected as shown below:

<u>Title page,</u>
Item [75], should read:

-- [75]  Inventors:   Erick Michael Anderson, Lake Orion;
                      Richard M. Grabowski, Davisburg;
                      Mark Wilsey, Howell,
                      all of MI (US) --

Signed and Sealed this

Eighteenth Day of March, 2003

JAMES E. ROGAN
*Director of the United States Patent and Trademark Office*